LOCKING AND UNLOCKING OF MEMORY DEVICES

Filed Dec. 30, 1958 6 Sheets-Sheet 1

Oct. 22, 1963 W. BUCHHOLZ 3,108,257

LOCKING AND UNLOCKING OF MEMORY DEVICES

Filed Dec. 30, 1958 6 Sheets-Sheet 3

LOCKING AND UNLOCKING OF MEMORY DEVICES

Oct. 22, 1963 W. BUCHHOLZ 3,108,257

LOCKING AND UNLOCKING OF MEMORY DEVICES

Filed Dec. 30, 1958 6 Sheets-Sheet 6

3,108,257
LOCKING AND UNLOCKING OF MEMORY DEVICES

Werner Buchholz, Wappingers Falls, N.Y., assignor to International Business Machines Corporation, New York, N.Y., a corporation of New York Filed Dec. 30, 1958, Ser. No. 783,755
11 Claims. (Cl. 340—172.5)

This invention relates to information-handling systems generally and more particularly to apparatus and a method for locking and unlocking memory in such systems, that is, for effectively protecting groups of information registers from unintentional or unauthorized alteration of contents or from the writing in of new information over still wanted old information.

While it has become a very useful and common practice in the operation of information-handling systems such as high speed automatic digital computers to have the computer, at times, alter information after it has been stored in a memory register or write desired new information in over no longer needed old information, there are times and situations in which there is a problem of guarding against unintentional or unauthorized altering or changing of the information content of registers.

The invention provides a particularly advantageous way of locking groups of memory devices so as to protect information which it is desired shall remain unchanged throughout a given program. For example, a portion of memory may be divided into two groups of registers, one group to receive instructions, which are not to be changed, and the other group to receive data which may be subject to change as the program progresses. While the program is being tested, the group of registers containing instructions may be locked. An alarm signal will be given whenever the program results in any attempt at altering an instruction. In this way, the attention of the operator is drawn to an error in the program.

Locking of memory, as described herein, also provides protection against interference between programs or between parts of the same program. Due to heavy demand on machine space there may be stored in the memory device two or more independent programs at the same time. These programs may be operated at different times by one person or by different persons. There may be interference between two programs whereby one program may cause changes or deletions of information stored for use under another program. It might be, for instance, that one program would call for storage of information in a block of memory registers overlapping a block already in use and containing information intended for use with the other program.

In this situation, one program may be tested with all groups of registers locked that are not assigned to that program. An alarm signal will then be given whenever there is any attempt at alteration of the information content of a locked register and the information if read out will automatically be rewritten into the register from which it came.

Registers containing especially valuable data, such for example as may be stored in the memory device to be used in several different problems or in connection with various programs, may be protected for an indefinite period by assigning the registers a locked status.

An object of the invention is to facilitate the locking and unlocking of memory registers.

A more particular object is to control the locking and unlocking of a plurality of registers simultaneously in large or small groups.

A feature of the invention is that any attempt to write new information into a locked register results in the original information content being retained and put back into the register.

Another feature is that the introduction of the invention does not interfere in any way with the reading out of information from any register whether locked or unlocked.

A further feature is that the status of a register as to locked or unlocked condition is not changed either by a read operation or by an attempted write operation but remains unchanged until altered by a special machine instruction or by direct intervention by the operator.

The indication of a register as "Locked" as used herein implies a prohibition to the effect "Don't Write." The indication of a register as "Unlocked" implies the absence of such a prohibition, making writing into the register permissible but saying nothing as to the actual information content of the register. The unlocked status may accordingly be taken as permissive, meaning "May Write."

In accordance with the invention, the indication of a register as "Locked" or "Unlocked" is effected by means of a single bit associated with the coding of each item of information that is stored, this extra bit being designated as the "Lock Bit." This bit, which may be regarded as a status bit, or more particularly as a Writing Status bit, comprises an adjunct such as a prefix or suffix to the bits which make up the coded form of the stored information.

The invention is particularly applicable to memory organizations of the matrix type. These have the property of random access and may have the added property of destructive read-out. Access is random when the registers need not be operated upon in any predetermined fixed order. In destructive read-out, the act of reading information out of a register clears the register, and, if information is wanted for later reference, it must be transferred elsewhere, as to a temporary register, and then put back into memory. Alternatively stated, if the register is to be cleared and new information substituted, reading the old information out automatically clears the register and thereupon new information may be put in. A random access memory with destructive read-out is exemplified by a magnetic core matrix, in which the cores store information by virtue of residual magnetism, of which one polarity may represent a binary "one" and the opposite polarity a binary "zero." The cores are considered to be normally in the "zero" state. A positive magnetizing pulse is used for writing a "one," by driving the core to magnetic saturation in the positive direction. At the termination of the pulse the core becomes unsaturated but is left in the "one" state. To write a "zero" in memory, the core is prevented from being switched out of the "zero" state when the abovementioned positive magnetizing pulse is applied, by means which may be termed an inhibit driver. Reading from memory is accomplished by applying a negative magnetizing pulse to the core. If the core to be read is in the "one" state, the pulse drives it to negative saturation, producing an output pulse in a sensing wire associated with the core. At the termination of the pulse the core is left unsaturated and in the "zero" state, thus in effect clearing the core. If the core to be read is initially in the "zero" state, the negative pulse leaves the core in the "zero" state. Thus, whether the core is originally in the "one" state or the "zero" state the process of reading the contents automatically clears the core.

A magnetic drum, on the other hand, exemplifies a type of memory which may be read without destroying the contained information. The information is stored by means of reversals in direction of magnetization. In the reading process, the passing of the drum under a reading head results in reading out the contents of the drum without destroying or altering the pattern of magnetization on the drum. When it is desired to substitute new information, the old information is destroyed while writing in the new information over the old, by well known means.

While the use of status bits has been suggested in connection with a memory of the magnetic drum type, a memory system without the property of random access does not adapt readily to simultaneous indication of a block of registers as locked or unlocked. Furthermore, two status bits have been required to control the locking and unlocking of a single register in a drum type system.

While the property of destructive read-out facilitates clearing of registers, non-destructive memories with random access, such as those in matrix form, may be used if means are provided for erasing the information stored in a register whenever it is desired to put new information in place of old.

In the system of the present invention, blocks of registers in any desired number and in any desired portion of the memory may be indicated substantially simultaneously as "Locked" or as "Unlocked," and only one status bit is required for each register which is to be controlled.

It is usual in operating a machine using a core type memory to employ a basic memory cycle having a read portion followed by a write portion. The same basic memory cycle is employed whether the operation to be performed is a read operation or a write operation. In a read operation, during the read portion of the memory cycle, the information content of a selected register is transferred to a temporary storage register. At a suitable time, the information in the temporary storage register is passed to a utilization device, for example the arithmetic and logical unit of a computer as for use in calculation, and then, during the write portion of the memory cycle, the information, still temporarily stored, is rewritten back into memory in the register where is was originally contained. In a normal write operation, the memory register is cleared and the information is not written back into memory. During the write portion of the memory cycle new information is written into the register in place of the old.

In accordance with the invention, the write operation is modified while no change is made in the read operation. In the modified write operation, during the read portion of the memory cycle, the information content of the selected register is transferred to a temporary storage register as in a normal write operation. During the write portion of the memory cycle, however, if the lock bit indicates a locked register, the new information is prevented from being written into the register and instead the original information content of the register is written back into the register. If the lock bit indicates an unlocked register there is no departure from normal operation. The old information is destroyed and the new information is written into memory in place of the old.

The invention provides for substantially simultaneously setting into like state the status bits associated with all the registers in a block that is to be indicated as "Locked" and for substantially simultaneously changing the status bits when it is desired to indicate that the registers in a block are unlocked.

In one illustrative arrangement, to indicate that a register is "locked," a status bit representing a "zero" is stored in a status core associated with that register; to indicate that the register is "unlocked," a status bit representing a "one" is stored in the status core.

Other features, objects and advantages will appear from the following more detailed description of an illustrative embodiment of the invention, which will now be given in conjunction with the accompanying drawings.

An illustrative form of the invention will be described in an embodiment which, among other uses, is suitable for use in memory systems of the general character described in the patent application of R. A. Gregory et al., Serial No. 592,545, filed June 20, 1956, now Patent No. 2,960,683, but it is of course to be understood that the invention in its broadest aspect is not limited to use with the system therein described.

The invention will first be described in general terms with reference to FIG. 1. Thereafter, the wiring scheme of the memory system will be described as shown in FIGS. 2–5. Finally, the invention will be described in more detail with reference to FIGS. 6 and 7.

Figure 1:
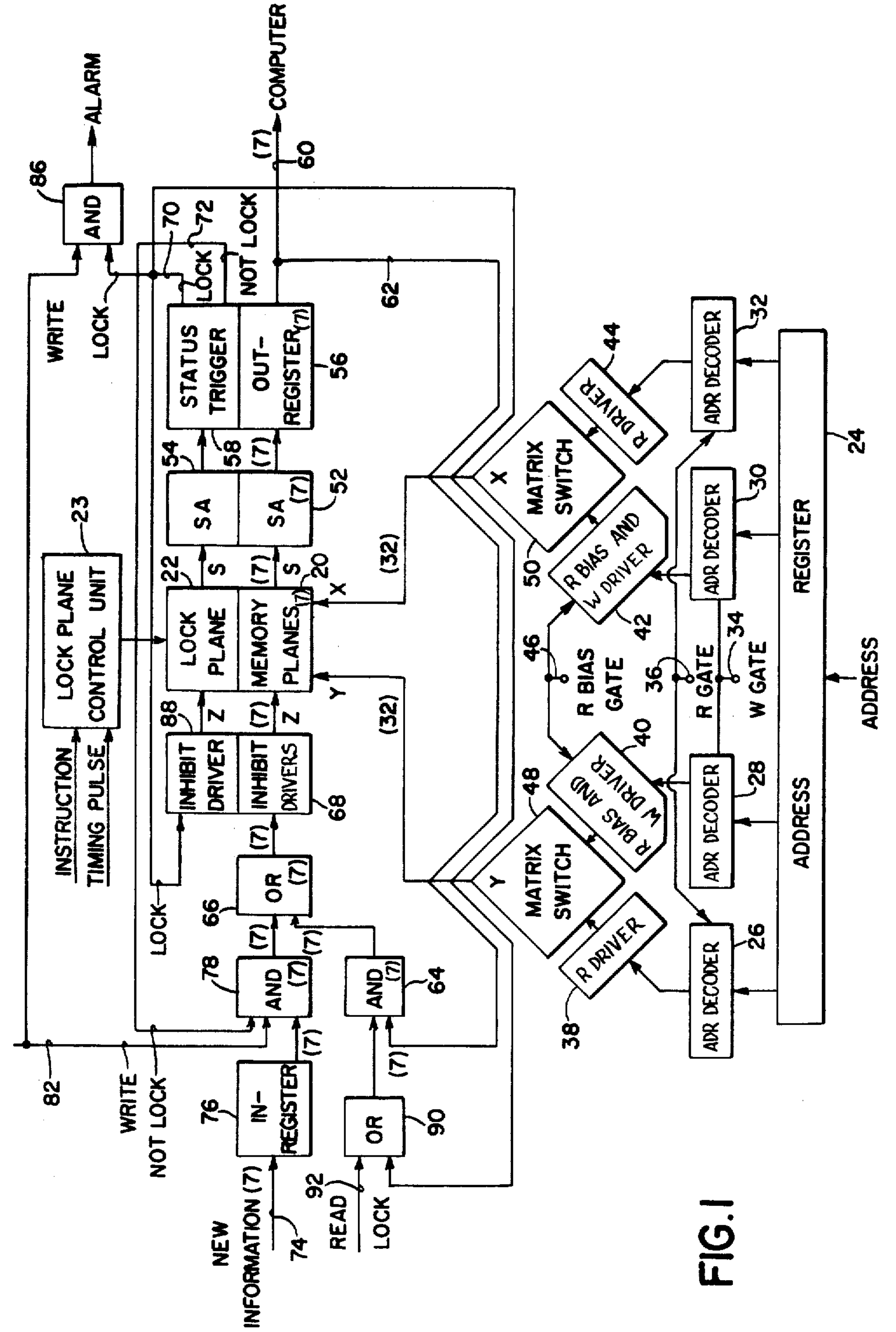
FIG. 1 is a general block schematic diagram of an information-handling system embodying the invention.

In the arrangement of FIG. 1, the invention is illustrated as applied to an information-handling system or data coordinator having a block 20 of seven memory core planes, each plane containing an array of magnetic cores in a square formation with 32 cores in a row and 32 rows, making a total of 1024 cores in each plane. The planes are assumed to be located in a stacked arrangement so that there are 1024 vertical columns of seven cores each, constituting 1024 registers, each register capable of storing the seven binary digits of a seven-digit number, instruction, word, or the like. The contents of a register may be referred to generally as a "word" or "character" or "character of data" regardless of its specific meaning.

In accordance with the invention, there is added to the stack of seven core planes, which will be referred to briefly as "memory planes," an eighth core plane 22 which also contains an array of cores in a square formation and has in this illustrative embodiment one core in each of the 1024 columns determined by the cores in the seven memory planes. The core plane 22 is called the Lock plane and is under the control of a Lock plane control unit 23 which is shown in greater detail in FIG. 7.

For selecting any desired register from the 1024 registers so that digital information may be stored therein or read out therefrom, selecting means are provided comprising an address register 24, and address decoders 26, 28, 30, 32. A terminal 34 is provided for applying a Write Gate (W Gate) pulse to the decoders 28 and 30 and a terminal 36 is provided for applying a Read Gate (R Gate) pulse to the decoders 26 and 32. The decoders 26, 28, 30, 32 control respectively an R Driver 38, an R Bias and W Driver 40, an R Bias and W Driver 42, and an R Driver 44. A terminal 46 is provided for applying a Read Bias Gate (R Bias Gate) pulse to the R Bias and W Drivers 40 and 42. The R Driver 38 and the R Bias and W Driver 40 jointly control a Y Matrix Switch 48 to select and energize one of 32 Y-wires shown in FIG. 3 which in turn have a part in selecting a single register in the memory planes 20 and a single core in the lock plane 22. The R Bias and W Driver 42 and the R Driver 44 jointly control an X Matrix Switch 50 to select and energize one of 32 X-wires shown in FIG. 3 which in turn cooperates with the selected Y-wire in selecting the desired single register and single core in the lock plane.

Each of the seven memory planes as well as the Lock plane has a sensing wire or winding S which passes through all the cores in the respective plane. Each sensing winding is connected to an individual sense amplifier SA. The seven sense amplifiers for the memory planes are represented in FIG. 1 by a single block 52 and the sense amplifier for the Lock plane is represented by the block 54. Where a single block or line in the drawing is to be understood to represent a plurality of similar units or parallel connections respectively, the number of units or connections represented is set down in parentheses. Through suitable gating circuits not shown in FIG. 1, the outputs from the sense amplifiers 52 are connected to individual trigger-type devices of a seven-bit temporary storage register 56 while the output from the sense amplifier 54 is connected to a single trigger, specifically a status trigger 58. In general, where gating and control circuits are omitted from FIG. 1 in the interest of clarity of overall description they are shown in detail in FIG. 6. The register 56 is designated as an Out-register for receiving information read out of memory. The seven trigger devices in the register 56 are connected respectively to seven conductors in a cable 60 which may be connected to the arithmetic and logical unit of a computer or other utilization device for data or information handling. Another cable 62 in parallel with cable 60 connects the outputs of the triggers in block 56 to a block 64 of "and" circuits the outputs of which are connected in turn to a block 66 of "or" circuits. The outputs of the "or" circuits 66 are connected to a set of inhibit drivers represented by a block 68, which drivers control the writing of information into the memory core planes of block 20.

The status trigger 58 has two outputs, a "Lock" output which appears on a lead 70 and a "Not Lock" output which appears on a lead 72. These outputs have most to do with the arrangements for writing new information into the memory, which arrangements will next be described.

A cable 74 is provided for bringing new information to the memory organization, as from the arithmetic and logical unit of the computer. The cable 74 terminates in an In-register 76. The register 76 is connected to a block 78 of "and" circuits the outputs of which are in turn connected to the input terminals of the "or" circuits 66. The inputs of the respective "and" circuits 78 are each connected to a "Write" control lead 82 and the "Not Lock" lead 72.

The "Lock" lead 70 together with the "Write" control lead 82 is connected to the input of an "and" circuit 86 the output of which goes to an alarm device. The lead 70 is also connected to an inhibit driver 88 that is individual to the lock plane 22 in the memory. Still another connection from the lead 70 goes to the input of an "or" circuit 90 along with a "Read" control lead 92. The output of the "or" circuit 90 is connected to the input of the "and" circuit 64 along with the cable 62.

In a write operation, in the system of FIG. 1, during the read portion of the memory cycle, the information content of a selected memory storage register, both in the memory planes 20 and in the lock plane 22, is read out by means of the sense wires S, amplified by the sense amplifiers 52, 54 and stored temporarily in the Out-register 56 and status trigger 58. If the selected memory register is one which is indicated as "Locked" as by the presence of a "zero" lock bit in the corresponding location in the lock plane, a "Lock" signal potential is developed on the line 70. This "Lock" signal conditions the "and" circuit 86 and also, through the "or" circuit 90, conditions the "and" circuit 64. The "Lock" signal is also applied to the inhibit driver 88 for the lock plane 22, conditioning that driver to re-write a "zero."

During the write portion of the memory cycle, new information may be available that has come in over the cable 74 and has been stored in the In-register 76 and has been applied to the "and" circuits of block 78. At the proper time, a Write pulse is applied to the lead 82. Still assuming the selected register is locked, this pulse energizes the conditioned "and" circuit 86 to actuate an alarm indicating that an instruction has been received to write information into a locked register. The "and" circuit 78 receives the Write pulse but is not actuated, due to the lack of a "Not Lock" signal on lead 72, thereby preventing the writing in of the new information into memory. The old information, however, is transmitted over cable 62 through the "and" circuit 64 and the "or" circuit 66 and is, at the proper time, written back into memory along with the "zero" status bit to indicate that the memory storage register is still locked.

In a read operation, the lock plane and the status bit contained therein have no effect upon the operation of the memory cycle. During the read portion of the memory cycle, the operation is the same as described above for the read portion of the memory cycle in a write operation, except that the information read out of memory is passed to the computer over the cable 60 at the proper time for its use in the computer.

During the write portion of the memory cycle, the content of the Out-register 56 in inverted form is transmitted through the cable 62 where it conditions the "and" circuit 64. When a Read pulse is received on line 92, the pulse is passed through the "or" circuit 90 and actuates the conditioned "and" circuit 64 so that the information is transmitted through the "or" circuit 66 to the inhibit drivers 68 which, at the proper time, rewrite the information into the selected memory register in the normal manner. The alarm circuit is not activated due to the fact that no Write pulse is applied to the "and" circuit 86 during the read operation. For the same reason, the "and" circuit 78 is not actuated. The lock bit "zero" is, however, rewritten due to the application of the Lock pulse to the inhibit driver 88, indicating that the selected memory register remains locked.

If the lock bit is a "one," indicating an unlocked register, the trigger 58 develops a signal on the "Not Lock" line 72, and only a relatively low potential on the line 70. The alarm circuit is thereby deconditioned, and in general the system is restored to normal operation. The Not Lock signal conditions the "and" circuit 78 so that upon the application of a Write pulse to the "and" circuit 78 new information may be written into the selected memory register. The relatively low potential of the Lock signal in the inhibit driver 88 assures that the "one" bit will be rewritten into the lock plane during the write portion of the memory cycle thus automatically regenerating the status bit. In a read operation, during the write portion of the memory cycle, rewriting into memory is under the control of a Read pulse applied to the "or" circuit 90 because the "and" circuit 64 can be activated by the Read pulse through the "or" circuit 90 in the absence of a Lock signal.

Referring now to FIGS. 2–5, there is shown in more detail a three dimensional magnetic core memory 150 in which the Lock plane of the present invention is incorporated and which corresponds to the blocks 20 and 22 in the system of FIG. 1. Magnetic cores are utilized as the basic storage elements of the memory 150 inasmuch as they are capable of storing information by virtue of their residual magnetism.

Figure 2:
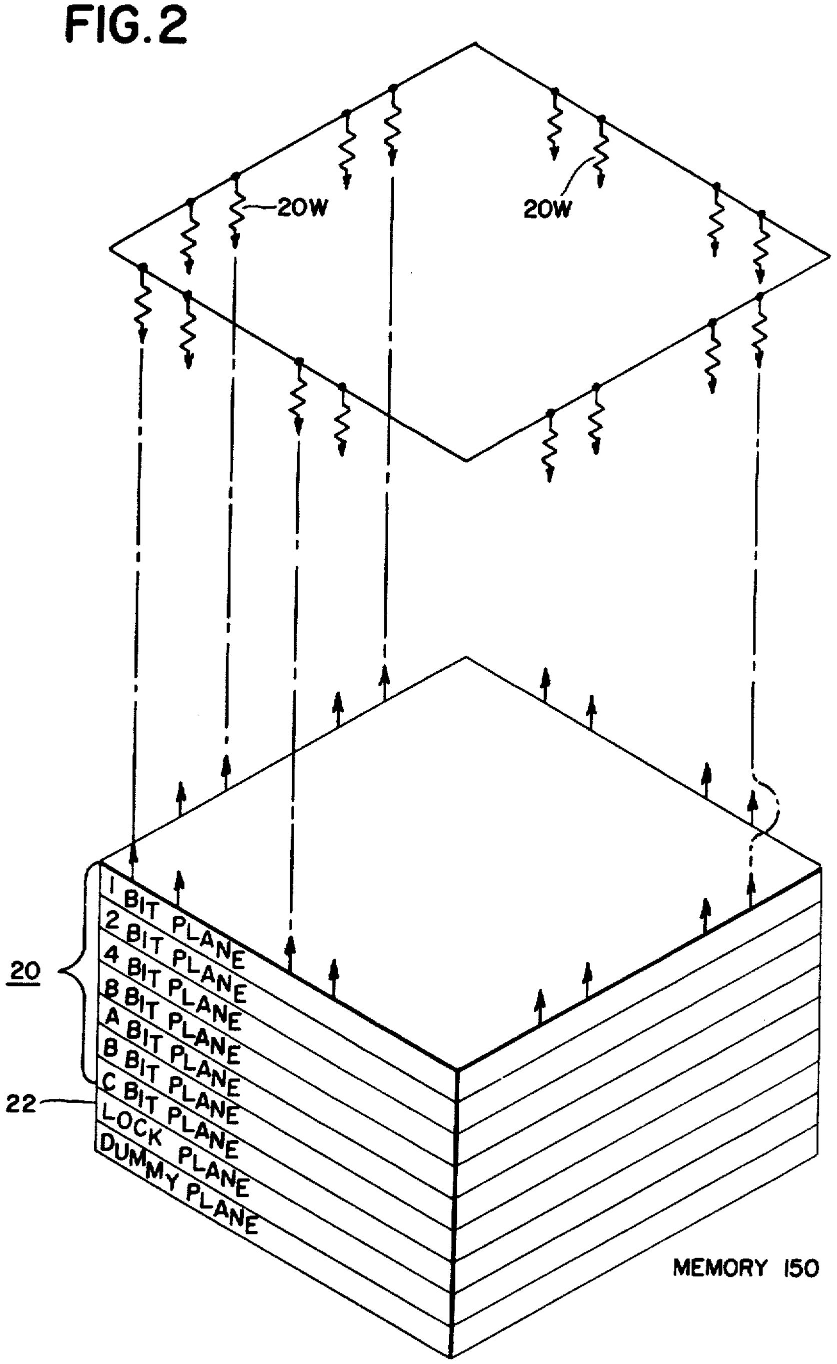
FIGS. 2 through 5 are perspective views, partly diagrammatic, showing wiring schemes in a typical memory organization embodying the invention.

The three dimensional memory 150 shown in block form in FIG. 2 is comprised of seven memory planes and the Lock plane, each of which consists of 1024 ferrite magnetic cores arranged in a 32 x 32 matrix, and a dummy plane. The seven memory planes of the memory 150 are hereinafter referred to as the C bit plane, B bit plane, A bit plane, eight bit plane, four bit plane, two bit plane and one bit plane corresponding to the seven bits of a Character of Data. Each group of seven memory cores occupying corresponding positions in the seven memory planes comprise a Storage Register for a Character and since each of the seven memory planes consist of 1024 memory cores, the memory 150 provides 1024 Storage Registers for 1024 Characters of Data. Thus, the C bits of all of the 1024 Characters are stored in the C bit plane, the B bits of all the 1024 Characters are stored in the B bit plane, etc. The memory core occupying the corresponding position in the Lock plane 22 provides storage for a Writing Status bit which is prefixed to the corresponding Character of Data.

Each memory core in the seven memory planes and the Lock plane has four wires passing therethrough, namely, an X current carrying wire, a Y current carrying wire, an inhibit current carrying wire Z and a sense wire S.

Figure 3:
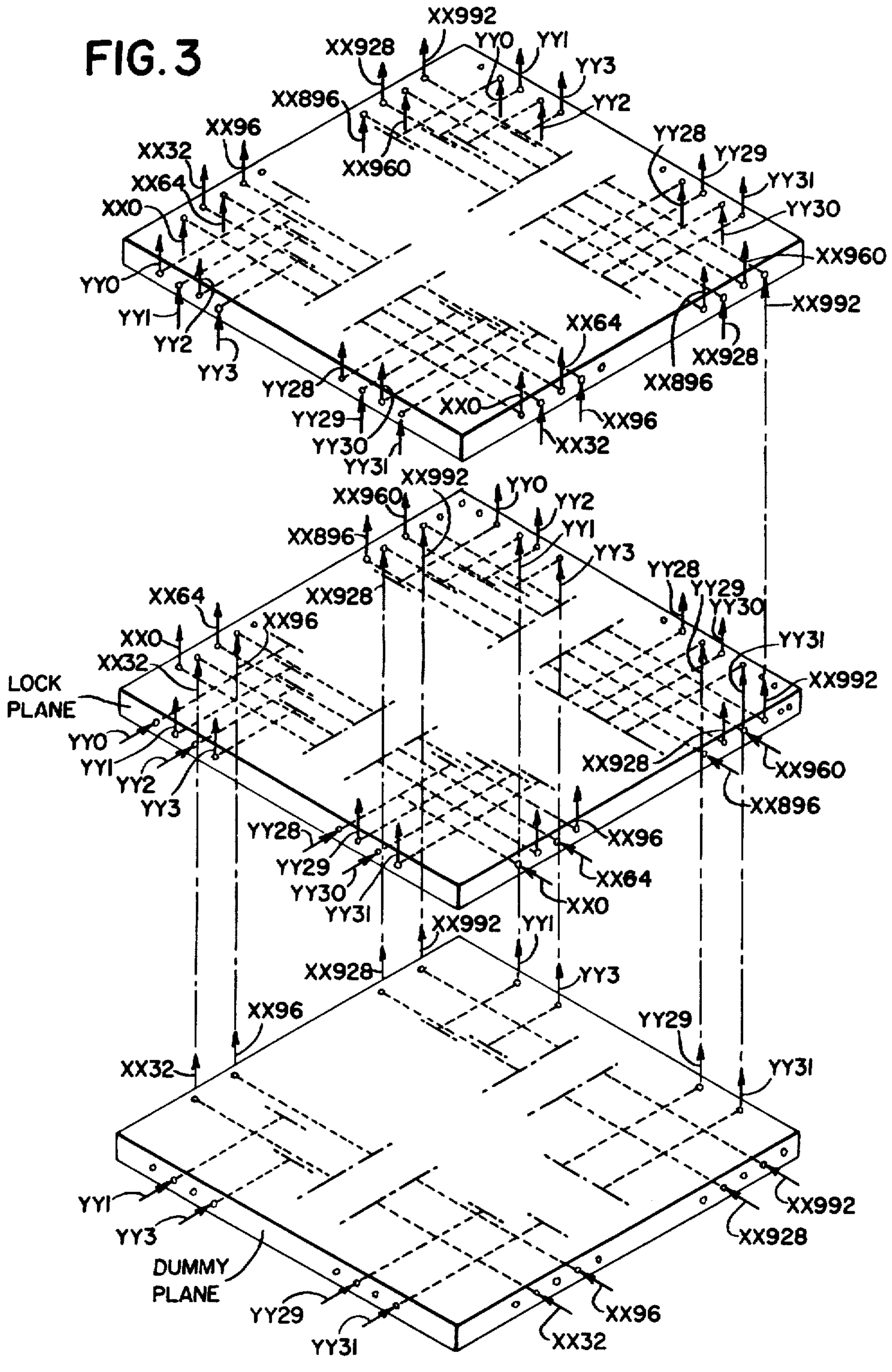

Since each memory plane and the Lock plane consists of a 32 x 32 array, provision is made for 32 separate and distinct X wires XX0, XX32, XX64 . . . XX960 and XX992 and 32 separate and distinct Y wires YY0, YY1, YY2 . . . YY30 and YY31 which run at 90° to each other, as shown in FIG. 3. Corresponding X wires in the Lock plane and in each memory plane are serially connected in such a manner that an X wire consists of a single wire passing from the Lock plane serially through the C, B, A, eight, four, two and one bit planes and then via a 20 ohm terminating resistor to a floating resistor common line. Likewise, corresponding Y wires in each plane are serially connected in such a manner that a Y wire consists of a single wire passing from the Lock plane serially through the C, B, A, eight, four, two and one bit planes and then via a 20 ohm terminating resistor to the floating resistor common line. Therefore, a selected X wire and Y wire intersect at eight memory cores, occupying corresponding positions in the Lock plane and in each of the seven memory planes, which comprise the status bit register and the seven bit Storage Register for a seven bit Character of Data.

It should also be noted that alternate X and Y wires are passed via the Dummy plane before passing via the Lock plane so that the alternate X and Y wires pass in opposite directions through each core plane. Thus, for example, the YY0 wire is applied directly to the front of the Lock plane and then through from front to back whereas the YY1 wire is applied directly to the Dummy plane, then, through from front to back and up to the Lock plane and then through from back to front, etc. so that adjacent X and Y wires pass in opposite directions through each core plane. This arrangement, in combination with the floating resistor common line, permits current flowing in a selected wire to reach the floating resistor common line and then pass via the unselected wires to offset the effects of any unwanted current that may have been induced in these wires.

Figure 4:
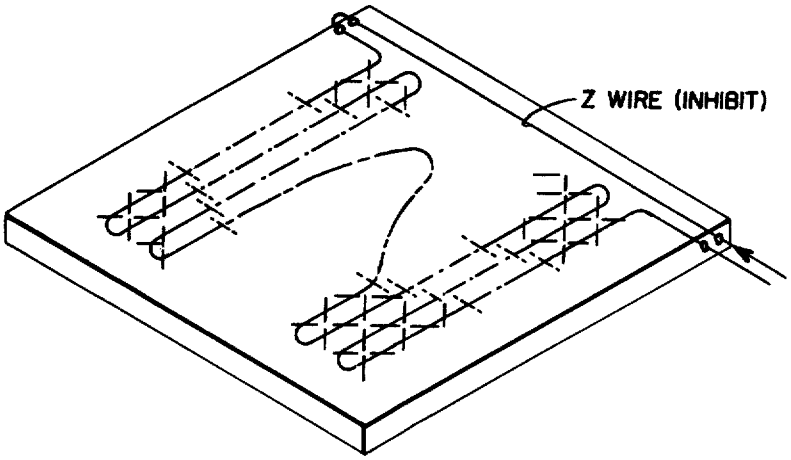

There are eight separate and distinct, that is, unconnected inhibit wires Z, one for each of the seven memory planes and one for the Lock plane, arranged so that each Z wire runs parallel to the Y wires in the associated plane and passes through every core in the plane, as shown for a representative plane in FIG. 4.

Figure 5:
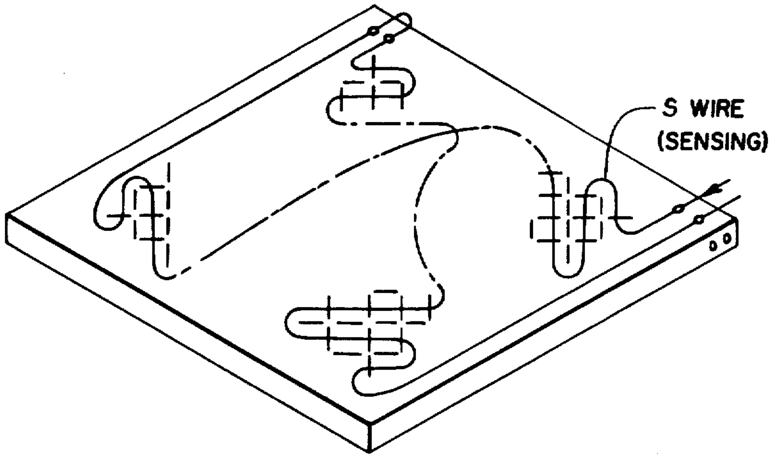

Also, there are eight separate and distinct, that is, unconnected sense wires S, one for the Lock plane and one for each of the seven memory planes, arranged so that each sense wire runs at 45° to any of the other previously mentioned wires and passes through all of the cores of its associated plane in a bipolar fashion, as shown for a representative plane in FIG. 5, that is, the sense wire enters some of the memory cores from the front and some from the back so that a change in flux causes a positive pulse to be induced in the sense wire in one case and a negative pulse in the other case. This arrangement is utilized to minimize the effects of half select current pulses in a manner to be described hereinafter.

The flux necessary to change the state of a magnetic core can be generated by the current carried in a single wire or by two wires each carrying half the current necessary to switch the core but of such polarity as to make their fluxes additive to change the state of the core.

In the memory 150, each memory core is intersected by an X and Y wire. Consequently, to change the state of a memory core, which is at the intersection of a selected X and Y wire, current pulses are coincidently applied to the selected X and Y wires. These current pulses are herein referred to as half select currents inasmuch as their magnitude is only half of that require to change the state of the core. However, the memory core which is at the point of intersection of the selected X and Y wires, receives the effects of both of the half select current pulses so that the combined flux, if in the proper direction, causes the memory core to change from its present state to the opposite state.

In selecting a Storage Register in the memory 150, all the cores on each of the selected X and Y wires are driven by the half select current pulses applied to the selected X annd Y wires. Therefore, all of the memory cores, except those at the points of intersection, are caused to move through a minor hysteresis excursion or loop and, at the termination of the half select current pulses, finally reach an equilibrium state hereinafter referred to as a disturbed state. Thus, if a memory core is in the undisturbed one state, the application of a negative half select current pulse causes the core to move through a minor loop to the disturbed one state. Likewise, if a memory core is in the undisturbed zero state, the application of a positive half select current pulse causes the core to move through a minor loop to the disturbed zero state. Each of these minor loops results in flux changes which induce small but unwanted noise pulses in the sense wire S. However, since the sense wire is bipolar wound, most of these noise pulses oppose each other and tend to be cancelled out.

Reading of a memory core lying at the intersection of a selected X and Y wire is accomplished by coincidently applying negative half select current pulses to each of the selected wires. Thus, if the memory core is in the one state, indicating that a "one" bit is stored therein, the application of the half select current pulses to the selected wire causes the core to travel along the hysteresis loop to negative saturation and finally coming to rest at the zero state. The flux created by this change of state induces a relatively large pulse in the sense wire passing through the selected memory core. On the other hand, if the memory core is in the zero state, indicating that a "zero" bit is stored therein, the application of the half select current pulses to the selected wires merely causes the core to travel to negative saturation and when the pulse is past, back to the zero state. The flux created by this movement induces a relatively small pulse in the sense wire passing through the selected memory core. Therefore, it is apparent that in reading a memory core, if the state of the core is changed a relatively large pulse is induced in the sense wire, corresponding to a "one" bit, but if no change in state occurs only a relatively small pulse is induced in the sense wire, corresponding to a "zero" bit. A time sampling arrangement may be provided as hereinafter described so that only the "one" bit pulse is sampled while the "zero" pulse and any unwanted half select pulses which are not cancelled are ignored.

Writing a "one" bit into a memory core lying at the intersection of a selected X and Y wire is accomplished by coincidently applying positive half select current pulses to each of the selected wires. Thus, if the memory core is in the zero or cleared state, the application of the half select current pulses to the selected wires causes the core to travel along the hysteresis loop to positive saturation and finally come to rest at the "one" state thereby storing a "one" bit. The flux created by this change of state induces a pulse in the sense wire. However, during a writing operation, no sampling occurs so that pulses induced in the sense wire can be ignored. In writing a "zero" bit into a memory core, an opposing half current pulse is applied to the inhibit wire passing through the selected core. The flux created by this opposing half current pulse opposes the combined flux created by the half select current pulses applied to and selected wires so that the resultant flux causes the core to travel through a minor loop and finally coming to rest at the disturbed zero state thereby storing a "zero" bit. Again, the flux created by this minor excursion induces a pulse in the sense wire which is ignored since no sampling occurs.

The memory is generally used with a basic cycle of operation as above described which consists of a read portion and a write portion. Thus, in a memory read operation, during the read portion of the cycle, each bit of a 7 bit character together with the associated status bit is read out of the memory cores, in a manner as previously described, of a selected Storage Register in the memory 50, sensed by the sense wires S, amplified by sense amplifiers, and normally transferred to a character register whereas, in a write operation during the read portion of the cycle, each bit of a 7 bit character together with the associated status bit is read out of the memory cores of the selected Storage Register, and while sensed by the sense wires S, this time there is no need for transfer to a character register. Therefore, in a write operation, the character read out during the read portion of the cycle is ignored and the operation, in effect, clears the Storage Register, so that a new character may be written therein during the next succeeding write portion of the cycle.

Also, in a read operation, in view of the destructive nature of the read-out, the character which was read out during the read portion of the cycle and transferred to a character register is normally rewritten back into the selected Storage Register during the write portion of the cycle by inhibit driving in the manner described herein whereas in a write operation, during the write portion of the cycle a new character is written into the selected Storage Register which was cleared during the read portion of the cycle.

The memory 20 of FIG. 1 consists of 1024 storage registers each of which is addressable and chosen, as explained above, by selecting one of the 32 X wires and one of the 32 Y wires of the memory 20. Consequently, means are provided to select one of the 32 X wires and one of the 32 Y wires of the memory 20 in accordance with the address of the selected Storage Register.

This selection is accomplished by using two magnetic switch core arrays, each of which consists of a two dimensional 4 x 8 matrix, namely the X switch matrix 50 and the Y switch matrix 48, of FIG. 1. A typical one of the 32 switch cores in each switch matrix consists of a magnetic core having a read winding, a write winding and an output winding. The read windings in each column of the matrices are serially connected to the output of an individual driver element comprised in the R Driver 38 or 44. Likewise, the write windings in each row of the matrices are serially connected to the output of an individual driver element comprised in the R Bias and W Driver 40 or 42. Also, one end of each of the 32 output windings of the X switch matrix 50 is connected to one of the 32 X wires of the memory 20 while the other ends of all of the output windings are connected to a floating common line. Similarly, one end of each of the 32 output windings of the Y switch matrix 48 is connected to one of the 32 Y wires of the memory 20 while the other ends of all of the output windings are also connected to the floating common line.

Here again, as in the memory 150, it is necessary to select one row in the X dimension and one column in the Y dimension of the X switch matrix 50 to uniquely select one switch core which, in turn selects one of the 32 X wires of the memory 20. Likewise, it is necessary to select one row in the X dimension and one column in the Y dimension of the Y switch matrix 48 to uniquely select one switch core which, in turn, selects one of the 32 Y wires of the memory 20. Thus, by selecting four lines, two per matrix switch, it is possible to select any combination of X and Y wire in the memory 20.

Since there are 1024 addressable Storage Registers in the memory 20, provision is made for selecting a particular X and Y wire of the memory 20 in accordance with the address of the selected Storage Register in the memory 20. Each of the 1024 addresses is represented by a ten order binary number, as for example:

| | 512 | 256 | 128 | 64 | 32 | 16 | 8 | 4 | 2 | 1 |
|---|---|---|---|---|---|---|---|---|---|---|
| Address 0000 | 0 | 0 | 0 | 0 | 0 | 0 | 0 | 0 | 0 | 0 |
| Address 0001 | 0 | 0 | 0 | 0 | 0 | 0 | 0 | 0 | 0 | 1 |
| * * | * | * | * | * | * | * | * | * | * | * |
| Address 0766 | 1 | 0 | 1 | 1 | 1 | 1 | 1 | 1 | 1 | 0 |
| * * | * | * | * | * | * | * | * | * | * | * |
| Address 1023 | 1 | 1 | 1 | 1 | 1 | 1 | 1 | 1 | 1 | 1 |

A ten order address register 24 is provided for storing the address of the Storage Register in memory 20 from which a character is to be read or in which a character is to be written.

The manner in which one of the 32 X and one of the 32 Y wires of the memory 20 is selected will now be described by way of example. Let it be assumed that the address 0766 is presently stored in the address register 24. The first five orders, 1, 2, 4, 8, 16, of the 10 order binary number stored in the address register 24, having 32 possible combinations, are used for selecting one of the 32 Y wires of the memory 20 while the last 5 orders, 32, 64, 128, 256 and 512, of the 10 order binary number, also having 32 possible combinations, are used for selecting one of the 32 X wires of the memory 20.

It will be assumed that the memory registers are numbered in such a way that the address 0766 is located at the intersection of the wires XX736 and YY30. It will also be assumed that the XX736 wire is connected to the output winding of that core in the X matrix switch 50 that is located at the intersection of the second row and eighth column; also that the YY30 wire is connected to the output winding of that core in the Y matrix switch 48 that is located at the intersection of the first row and seventh column.

In what follows, it will be assumed that all the cores in both matrix switches 48 and 50 are initially in the reset condition.

At the proper time in the read portion of a memory cycle, a positive pulse having a suitable period of say 4.5 microseconds, is applied via the R Bias Gate line 46 to the R Bias and W Drivers 40 and 42, respectively. The switch core drivers in block 40 in response thereto apply bias current on selected rows, which for the present example are the second, third and fourth rows of the Y switch matrix 48, causing all of the switch cores on each of these rows to be driven to negative saturation and leaving the cores in the first row unsaturated. The switch core drivers in block 42 respond by applying negative bias current on selected rows, which for the present example are the first, third and fourth rows of the X switch matrix 50, causing all of the switch cores on each of these rows to be driven to negative saturation and leaving the cores in the second row unsaturated.

During the 4.5 microsecond period of the positive pulse on the R Bias Gate line 46, a positive pulse is applied via the R Gate line 36 to the address decoders 26 and 32. The positive pulse on the R Gate line 36 applies a positive select current pulse to drive a selected column, in this example the seventh column, of the Y switch matrix 48. Since only one switch core in the column is in the unbiased state, namely the switch core at the intersection of the first row and seventh column, only that switch core switches from the reset to the set condition and induces a current in its output winding causing a negative half select current pulse to be applied, in this example via the YY30 wire, to the memory 20, this being the Y wire which is controlled by the switch core at the intersection mentioned. The positive pulse on the R Gate line 36 also applies a positive select current pulse to drive a selected column in this example the eighth column, of the X switch matrix 50. Since only one switch core in the column is in the unbiased state, namely, the switch core at the point of intersection of the eighth column and second row, only that switch core switches from the reset condition to the set condition and induces a current in its output winding causing a negative half select current pulse to be applied, in this example via the XX736 wire to the memory 20. Thus, it should be apparent, that the XX736 and YY30 wires are chosen in accordance with the address 0766 setting of the address register 24. During a read operation this causes a character to be read out of the memory 20 while during a write operation this effectively causes the selected storage register to be cleared in preparation for receiving a character. When the positive pulse on the R Bias Gate line 46 terminates, the bias is removed from the unselected rows of cores in the X and Y switch matrices 50 and 48, restoring these cores to the unsaturated state.

At the proper time in the write portion of a memory cycle, a positive pulse is applied to the W Gate line 34 which applies a negative current driving pulse, in this example, along the first row of the Y switch matrix 48. Since only one switch core in the first row is in the set condition, namely, the switch core at the intersection of the first row and seventh column, only that switch core is switched back from the set condition to the reset condition and induces a current in its output winding causing a positive half select current pulse to be applied via the selected YY30 wire to the memory 20.

At the same time, the positive pulse on the W Gate line 34 applies a negative current driving pulse, in this example along the second row of the X switch matrix 50. Since only one switch core in the second row is in the set condition, namely, the switch core at the intersection of the second row and eighth column, only that switch core is switched back from the set condition to the reset condition and induces current in its output winding causing a positive half select current pulse to be applied via the selected XX736 wire of the memory 20. Thus, it should be apparent, that the XX736 and YY30 lines are again selected in accordance with the address 0766 setting in the address register 24. During the normal read operation this causes a character which was previously read out to be rewritten into the selected storage register of the memory 20 while during a write operation this effectively causes a new character to be written into the memory 20.

In a similar manner, each storage register of the memory 20 is chosen by selecting one of the 32 X wires and one of the 32 Y wires of the memory 20 in accordance with the address of the selected storage register in the memory 20.

Since the addressing of memory and the reading out or writing in of data are known processes, no more detailed description of these processes is necessary here.

Figure 6:
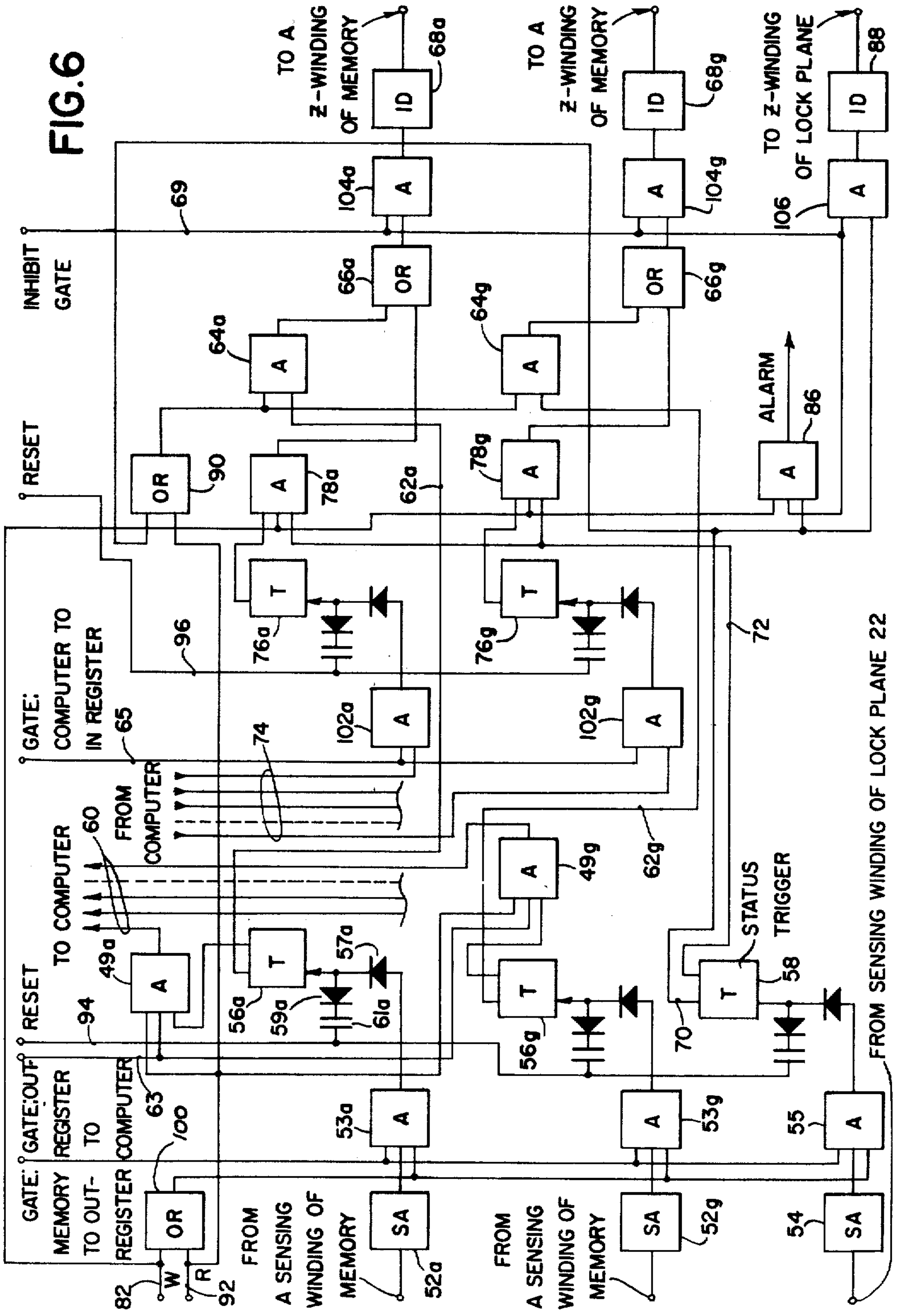
FIG. 6 is a detailed schematic diagram of a portion of a system like that shown in FIG. 1.

FIG. 6 shows a portion of the system of FIG. 1 in greater detail. For the sake of clarity, only circuits for the Lock plane and two ordinary planes of the memory 20 are shown in full. Individual sense amplifiers 52*a* . . . 52*g* are indicated in place of the block 52 of FIG. 1. Individual triggers 56*a* . . . 56*g* are indicated for the Out-register 56 and individual triggers 76*a* . . . 76*g*, for the In-register 76. Individual "and" circuits 64*a* . . . 64*g*, replace the "and" block 64 and individual "and" circuits 78*a* . . . 78*g* replace the "and" block 78. Individual circuits replace the "or" block 66, and the inhibit driver block 68, while individual conductors replace the cables 60, 62 and 74. Reset connections for simultaneously resetting all of the triggers in a register are provided, comprising lead 94 for resetting the triggers 58, 56*a* . . . 56*g*, and lead 96 for resetting triggers 76*a* . . . 76*g*. It will be understood that, just as the components indicated by reference numerals having the suffix "*g*" are connected in FIG. 6 with those having the suffix "*a*" to provide for two of the ordinary planes of memory, so additional corresponding components to provide for, say, five or more additional ordinary planes of memory are similarly connected.

The blocks marked "A," "OR," and "T" in FIG. 6 correspond respectively to AND circuits, OR circuits and triggers respectively; the blocks marked "SA" correspond to sensing amplifiers; and the blocks marked "ID" correspond to inhibit drivers, all of which are known per se. Illustrative forms of all of these circuits are shown in the above-mentioned application of R. A. Gregory et al., Serial No. 592,545, filed June 20, 1956. The AND circuits have the well known characteristic that the output of the circuit is energized in a prescribed state when and only when every input to the circuit is in its prescribed state. In the OR circuits, the output is energized in a prescribed state when any one or more of the inputs to the circuit is in its prescribed state. The trigger circuits have two stable states and remain in either state until caused to change to the other state by application of a prescribed signal. The sensing amplifiers may, as illustrated in the above-mentioned application, include, in addition to two stages of amplification and an output cathode follower, and initial full wave rectifier to convert the input signals to signals of the same polarity. The inhibit drivers are gate-controlled feed- back current amplifiers.

Additional gating and control circuits not shown in FIG. 1 are included in FIG. 6. For example, an "and" circuit 53*a* is shown inserted between sensing amplifier 52*a* and trigger 56*a*. Similarly, "and" circuits are provided between each sensing amplifier and its associated trigger, e.g., "and" circuit 53*g* between sensing amplifier 52*g* and trigger 56*g*, and "and" circuit 55 between sensing amplifier 54 and status trigger 58. Each of the "and" circuits 53*a* . . . 53*g*, and 55 requires conditioning by either a Read control pulse from a lead 92 or a Write control pulse from a lead 82, through an "or" circuit 100, simultaneously with a gate control pulse from a lead 93. Each trigger 56*a* . . . 56*g*, 58, 76*a* . . . 76*g*, is provided with a conventional combined setting and resetting input circuit, comprising for example a setting diode 57*a* in the connecting lead from the output of "and" circuit 53*a* to the input of trigger 56*a*, and a serial combination of a reversely polarized diode 59*a* and capacitor 61*a* connecting the lead 94 to the input of trigger 56*a*.

A group of "and" circuits 49*a* . . . 49*g* is inserted between the triggers 56*a* . . . 56*g* and the cable 60, with a gate lead 63 connected to the inputs of all the "and" circuits 49*a* . . . 49*g*. Another group of "and" circuits 102*a* . . . 102*g*, is inserted between the cable 74 and the triggers 76*a* . . . 76*g*, with a gate lead 65 connected to the inputs of all the "and" circuits 102*a* . . . 102*g*. Still another group of "and" circuits 104*a* . . . 104*g*, is inserted between the "or" circuits 66*a* . . . 66*g*, and the inhibit drivers 68*a* . . . 68*g*. An inhibit gate lead 69 is connected to the inputs of all the "and" circuits 104*a* . . . 104*g*, and to the input of an "and" circuit 106. The circuit 106 is inserted between the status trigger 58 and the inhibit driver 88.

The operation of the system of FIG. 6 will first be explained with reference to a write operation (*a*) upon a locked register and (*b*) upon an unlocked register. Then it will be shown that in a read operation the action of the system is normal whether the register operated upon is locked or unlocked.

In the read portion of the memory cycle a write operation starts out in similar fashion regardless of whether the register operated upon is locked or unlocked. Pulses are applied to the sensing amplifiers 52*a* . . . 52*g*, and 54 over input leads from the respective sensing windings of the cores in the memory planes 20 and in the Lock plane 22. These pulses are of gently rounded wave form and depend in amplitude and in time of arrival upon whether they originate in a core that is in the "one" state or in a core that is in the "zero" state. The pulses corresponding to the "one" state are relatively strong while those corresponding to the "zero" state are relatively weak and reach their maximum amplitude slightly ahead of the stronger pulses.

The "and" circuits 53*a* . . . 53*g*, 55 into which the respective sensing amplifiers feed are conditioned by either a Write pulse on lead 82 or a Read pulse on lead 92 so that these "and" circuits are conditioned in like manner through the "or" circuit 100 for either a write operation or a read operation. At such time as the pulses from cores in the "one" state are at their strongest a gate pulse is received over lead 93. If, for example, the sensing amplifier 52*a* receives a pulse from a core that is in the "one" state, a sharp pulse of relatively high potential is produced in the "and" circuit 53*a* that is suitable for setting the trigger 56*a*. If, on the other hand, the sensing amplifier 52*a* receives a pulse from a core that is in the "zero" state, the pulse is relatively weak and arrives ahead of the gate pulse, with the result that a relatively weak pulse is produced in the "and" circuit 53*a* that is unable to set the trigger 56*a*. In either case it will be assumed that all the triggers 56*a* . . . 56*g*, and 58 have previously been reset by means of a negative pulse over the lead 94. Therefore, those triggers which receive a pulse from a core that is in the "one" state will be set and all the other triggers will remain in the reset state. As a result, the contents of the selected memory register have been transferred to and are now stored in the triggers 56*a* . . . 56*g*, 58. The triggers that are set produce a relatively high potential output on the set side (the right hand side in the drawing) and a relatively low potential output on the reset side (the left hand side in the drawing). The triggers that are in the reset state produce a relatively high potential on the reset side and a relatively low potential on the set side. Thus, the information content of the selected memory register is stored in inverted form on the reset side of the triggers and in uninverted form on the set side.

It will be noted that, while in a normal write operation during the read portion of the memory cycle there is no need to store the information content of the selected memory register, in accordance with the invention a departure is made from the usual practice in this respect in order that the information will be available for rewriting into memory in case the selected memory register is in the locked status.

The stored information in inverted form is passed from the reset side of the triggers 56*a* . . . 56*g*, to the respective "and" circuits 64*a* . . . 64*g*, while the information in uninverted form is passed from the set side of the same triggers to the respective "and" circuits 49*a* . . . 49*g*.

The further action of the system in a write operation from this point on is under the control of the status trigger 58 as will now be seen.

The case of a locked memory register will first be considered. Accordingly, it will be assumed that the lock bit associated with the selected memory register is a "zero" and that a "zero" lock bit indicates a locked register, that is one into which no writing is to be permitted. The trigger 58 will now be in the reset state wherein there is a relatively high potential on the output lead 70 and only a relatively low potential on the output lead 72.

The Lock potential on lead 70, among other things conditions the "and" circuit 86 which in turn controls an alarm. When a Write pulse is present on lead 82 signifying a write operation, the "and" circuit 86 is further conditioned, so that when an inhibit gate pulse occurs over lead 69, the "and" circuit 86 is actuated, thereby giving an alarm to indicate an illegitimate operation.

The Lock potential on lead 70 also sends a current through the "or" circuit 90 to actuate such of the "and" circuits 64*a* . . . 64*g* as are conditioned by the triggers 56*a* . . . 56*g*, with the result that the inverted information content of the selected memory register is sent via the "or" circuits 66*a* . . . 66*g*, to the "and" circuits 104*a* . . . 104*g*.

At a suitable time during the write portion of the memory cycle, when X and Y pulses are being applied to the memory cores, an inhibit gate pulse is applied to the inputs of all the "and" circuits 104*a* . . . 104*g*, over the lead 69, thereby passing high potential pulses to the inhibit drivers 68*a* . . . 68*g*, respectively, in the case of those of the "and" circuits that are conditioned. Consequently, those memory cores in the selected memory register that were originally in the "zero" state are left in the "zero" state while those that were originally in the "one" state are restored to the "one" state. The information content of the selected locked memory register is thus preserved and rewritten into the selected register.

The Lock potential on lead 70 also applies a relatively high potential to the "and" circuit 106 preparatory to regenerating a "zero" status bit in the Lock plane 22. When the inhibit gate pulse is received over lead 69 the "and" circuit 106 is actuated along with such of the "and" circuits 104*a* . . . 104*g*, as are conditioned, thereby insuring the maintenance of the "zero" status bit in the Lock plane to indicate that the selected memory register is still in the locked status.

The "and" circuits 78*a* . . . 78*g*, receive the Write pulse over the lead 82 but none of these is actuated where a locked register is involved, due to the lack of a high potential "Not Lock" signal on the lead 72, thereby preventing writing of new information into the memory. The "and" circuits 49*a* . . . 49*g*, are deconditioned due to the lack of a Read pulse on lead 92, so that the contents of the Out-register 56 is not transmitted to the computer.

The case of a write operation upon an unlocked register will now be considered. In this case, the status bit in the Lock plane is a "one," indicating an unlocked register. The status trigger 58 will be set, giving a relatively high potential on the lead 72 and a relatively low potential on the lead 70. The "and" circuits 64 are now deconditioned so that the information read out of the selected memory register is not rewritten into memory. The "and" circuit 86 is likewise deconditioned so that no alarm will be sent. Furthermore, the "and" circuit 106 is deconditioned so that no inhibit current is supplied to the Lock plane by the inhibit driver 88 with the result that a "one" will be regenerated as the status bit for the selected memory register to indicate the continued unlocked status of the register.

At the appropriate time, new information is received over the cable 74 and is gated to the triggers 76*a* . . . 76*g* through the "and" circuits 102*a* . . . 102*g*, by means of a gate pulse delivered over the lead 65. The information is passed in inverted form from the reset output terminals of the triggers to the "and" circuits 78*a* . . . 78*g*. The latter "and" circuits are conditioned by the high potential on the lead 72 and the Write pulse on lead 82 to pass the information along through the "or" circuits 66*a* . . . 66*g*, to the "and" circuits 104*a* . . . 104*g*. During the write portion of the memory cycle, the inhibit gate pulse actuates the "and" circuits 104*a* . . . 104*g*, which in turn activate the inhibit drivers to write the new information into the selected memory register in the normal manner.

The "and" circuits 64a . . . 64g, are deconditioned due to the lack of either a "Lock" signal on the lead 70 or a Read pulse on the lead 92, thereby preventing rewriting of the old information into memory. The "and" circuits 49a . . . 49g are also deconditioned due to the lack of a Read pulse on the lead 92, so that the old information is not transmitted to the computer.

It will now be shown that the use of the status bit and status trigger does not interfere with the normal operation of the system in a read operation, upon either a locked or an unlocked register.

In the case of a read operation, whether upon a locked or an unlocked register, during the read portion of the memory cycle, the information content of the selected memory register is read out, amplified in the sense amplifiers 54, 52a . . . 52g, and stored in the triggers 58, 56a . . . 56g, exactly as in the read portion of a write operation. When the triggers 56a . . . 56g, 58 have all had sufficient time to operate, a gate pulse is applied over the lead 63 to all the "and" circuits 49a . . . 49g, to pass the stored information from the triggers in uninverted form to the cable 60 for transmission to the computer.

In the case of a locked register, the trigger 58 being in the reset state applies a relatively high potential via lead 70 and through the "or" circuit 90 to actuate all the conditioned "and" circuits in the group 64a . . . 64g, with the result as before that the inverted information content of the selected register is sent through the "or" circuits 66a . . . 66g, to the inhibit drivers 68a . . . 68g, upon the receipt of an inhibit gate pulse over lead 69. In this way the information is written back into the selected register. It will be noted that in addition to the conditioning potential on lead 70 during a read operation, the "and" circuits 64a . . . 64g, receive a conditioning Read pulse on lead 92, either of which alone is sufficient for the purpose.

The "and" circuit 86 for controlling the alarm is deconditioned due to the lack of a Write pulse on lead 82 during a read operation. Consequently, no alarm is given.

The lead 70 does however apply a relatively high potential to the "and" circuit 106, so that upon the receipt of the inhibit gate pulse, the "zero" status bit is retained in the Lock plane to indicate that the associated register remains in the locked status.

In the case of a read operation upon an unlocked register, the read-out information is passed to the computer as in the case of a locked register. The trigger 58, being in the set state, now applies only a low potential via lead 70 and through the "or" circuit 90 to the "and" circuits 64. However, the "and" circuits 64 are conditioned by the Read pulse on lead 92. Therefore, the information obtained from the selected register is rewritten into the register in the normal manner.

The "and" circuit 86 is deconditioned as before due to the lack of a Write pulse on lead 82 so that no alarm is given.

The lead 70 now applies only a relatively low potential to the inhibit driver 88, so that no inhibit current is developed and consequently, during the write portion of the memory cycle. a "one" bit is regenerated in the Lock plane to indicate that the associated register remains in the unlocked status.

In a read operation, new information from the computer is blocked by the lack of a gate pulse on the lead 65.

Figure 7:
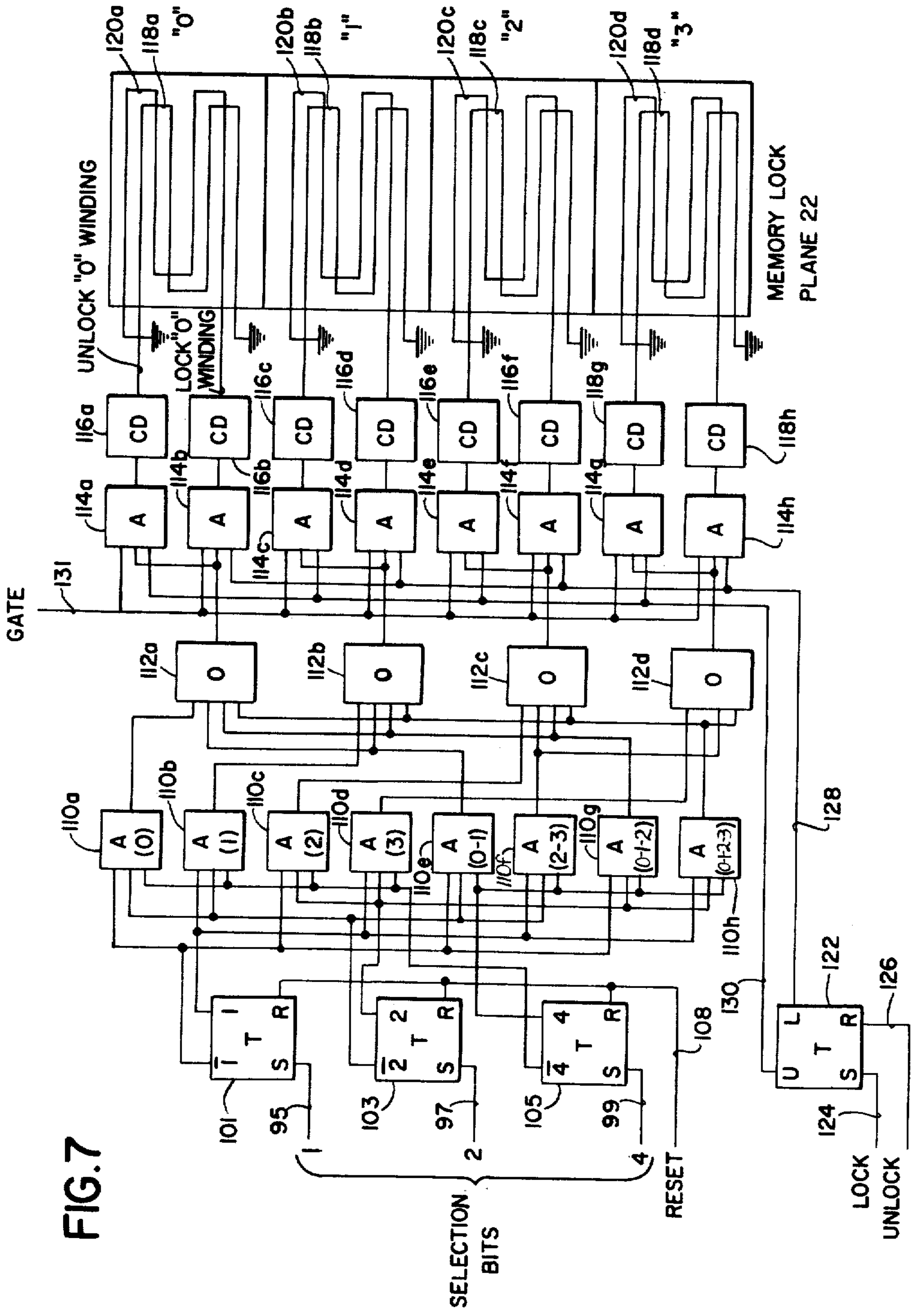
FIG. 7 is a schematic diagram of an illustrative arrangement for selecting particular sections of memory the statuses of which are to be indicated in accordance with the invention.

It will be noted that the status bit of a memory register, whether locked or unlocked is always regenerated during each memory cycle involving the register, the status of the register remaining constant until such time as the status is changed as by use of the system of FIG. 7. Separate Lock and Unlock instructions are required for operating the system of FIG. 7. The instruction may take the form of an operation code portion comprising a combination of binary digits standing for the operation "Lock memory" or "Unlock memory" as the case may be, followed by an address portion comprising a combination of binary digits standing for the address of the particular portion of memory that is to be locked or unlocked.

FIG. 7 shows an illustrative example of an arrangement for selecting one or more blocks of registers in memory for the purpose of indicating the status of such registers as locked or unlocked and changing the status from locked to unlocked or vice versa as desired. The figure includes a simple type of address register addressable over input leads 95, 97, 99, a simple form of decoding and driving system and a schematic representation of a sectionalized Lock plane 22. The address register comprises a one bit trigger 101, a two bit trigger 103 and a four bit trigger 105. The Lock plane is shown as divided into four sections, "0", "1", "2" and "3". The three triggers provide a total of eight permutations which may for example be used according to the following code:

| Address | Memory Sections |
|---|---|
| 000 | 0 |
| 001 | 1 |
| 010 | 2 |
| 011 | 3 |
| 100 | 0 and 1 |
| 101 | 2 and 3 |
| 110 | 0, 1 and 2 |
| 111 | 0, 1, 2 and 3 |

The 1 output of the trigger 101 is connected to an input terminal of each of the "and" circuits 110b, 110d, 110f and 110h. The $\bar{1}$ output of this trigger is connected to the "and" circuits 110a, 110c, 110e and 110g. The 2 output of the trigger 103 is connected to the "and" circuits 110c, 110d, 110g and 110h while the $\bar{2}$ output is connected to the "and" circuits 110a, 110b, 110e and 110f. The 4 output of the trigger 105 is connected to the "and" circuits 110e, 110f, 110g and 110h while the $\bar{4}$ output is connected to the "and" circuits 110a, 110b, 110c and 110d.

A re-set lead 108 is provided which is connected in parallel to the re-set input terminals of all the triggers 101, 103, 105.

The decoding and driving system comprises a plurality of "and" circuits 110a . . . 110h. The "and" circuits are connected in various combinations to "or" circuits 112a, 112b, 112c, 112d according to the address code that is used. In the embodiment illustrated, the "and" circuits 110a, 110b, 110c and 110d are connected respectively to the "or" circuits 112a, 112b, 112c and 112d; the "and" circuit 110e is connected to "or" circuits 112a and 112b; the "and" circuit 110f to "or" circuits 112c and 112d; the "and" circuit 110g to "or" circuits 112a, 112b and 112c; and the "and" circuit 110h to "or" circuits 112a, 112b, 112c and 112d.

The outputs of the "or" circuits are connected each to a pair of "and" circuits comprising a group 114a . . . 114h, the "or" circuit 112a being connected to "and" circuits 114a and 114b, the "or" circuit 112b to "and" circuits 114c and 114d, the "or" circuit 112c to "and" circuits 114e and 114f, and the "or" circuit 112d to "and" circuits 114g and 114h. The "and" circuits 114a . . . 114h, feed in turn into core drivers 116a . . . 116h, respectively.

The output circuit of the driver 116a comprises a wire 118a which passes through all the cores in the "0" section of the memory lock plane 22 and thence to ground. The wire 118a constitutes an Unlock "0" winding, as it passes through each core in such a direction that when the wire 118a is energized by the driver 116a the cores are switched to the "one" state, indicating an unlocked status for the associated registers in memory. The output circuit of the driver 116b comprises a wire 120a which passes through all the cores in the "0" section of the memory lock plane 22 in the opposite direction to wire 118*a* and thence to ground. The wire 120*a* constitutes a Lock "0" winding, as it passes through each core in such a direction that when the wire 120*a* is energized by the driver 116*b* the cores are switched to the "zero" state, indicating a locked status for the associated registers in memory.

Similarly, the output circuit of the driver 116*c* comprises a wire 118*b* which constitutes an Unlock "1" winding and the output circuit of the driver 116*d* comprises a wire 120*b* which constitutes a Lock "1" winding.

The drivers 116*e* and 116*f* are connected to the Unlock "2" winding 118*c* and the Lock "2" winding 120*c*, respectively, and the drivers 116*g* and 116*h* are connected to the Unlock "3" winding 118*d* and the Lock "3" winding 120*d*, respectively.

A trigger 122 is provided with a Lock input lead 124 and an Unlock input lead 126. The trigger 122 has a Lock output lead 128 and an Unlock output lead 130. A gate lead 131 is provided that is connected to the inputs of all the "and" circuits 114*a* . . . 114*h*. The Lock lead 128 is connected to the inputs of the "and" circuits 114*b*, 114*d*, 114*f* and 114*h*, while the Unlock lead 130 is connected to the inputs of the "and" circuits 114*a*, 114*c*, 114*e* and 114*g*.

In the operation of the system of FIG. 7, to set the status cores in a selected portion of the Lock plane 22 to indicate a locked status, a pulse may be applied to the Lock input lead 124 of the trigger 122 to set this trigger, thereby providing a Lock output potential on the lead 128. This partially conditions the "and" circuits 114*b*, 114*d*, 114*f* and 114*h* while the "and" circuits 114*a*, 114*c*, 114*e* and 114*g* are deconditioned. The coded address of the section or sections of memory that are to be locked determines which of the triggers 101, 103, 105 will be set and which will remain in the re-set condition. If, for example, section "0" alone is to be locked, then, after the triggers 101, 103, 105 have been cleared by means of a pulse over lead 108, the application of the code address 000 to the triggers will leave them all in the reset condition, thereby applying relatively high level inputs to the three input terminals of "and" circuit 110*a*. None of the other "and" circuits 110*b* . . . 110*h* receives as many as three high level inputs, so that no other "and" circuit in this group is conditioned. Accordingly, the "and" circuit 110*a* passes a pulse through the "or" circuit 112*a* to the "and" circuits 114*a* and 114*b*. Due to the set trigger 122, only the "and" circuit 114*b* is conditioned, so that when a gate pulse is applied over lead 131, only the driver 116*b* is energized, thereby sending current through the Lock "0" winding 120*a*. This current changes all the cores in the "0" section of the Lock plane 22 to the "zero" state, indicating that all the memory registers associated with section "0" of memory are in the Locked status.

If it is desired to lock the entire memory, the code address 111 is applied, thereby setting all the triggers 101, 103, 105 and conditioning only the "and" circuit 110*h*. The "and" circuit 110*h*, working through the "or" circuits 112*a*, 112*b*, 112*c*, and 112*d*, applies inputs to all the "and" circuits 114*a* . . . 114*h*. Of these, only the "and" circuits 114*b*, 114*d*, 114*f* and 114*h* are now conditioned. When a gate pulse is applied over the lead 131, the drivers 116*b*, 116*d*, 116*f* and 116*h* are energized, thereby sending current through the Lock windings for sections "0," "1," "2," and "3." Thus all the cores in Lock plane 22 are changed to the "zero" state, indicating that the entire memory is locked If it is desired to lock sections "0" and "1" only, the code address 100 is applied, thereby setting trigger 105 only and conditioning "and" circuit 110*e* only. As a result, windings 120*a* and 120*b* alone are energized. Similarly, other single sections or combinations of sections in the memory may be locked by using appropriate code addresses.

In the operation of the system of FIG. 7 to set the status cores in a selected portion of the Lock plane 22 to indicate an unlocked status, a pulse may be applied to the Unlocked input lead 126 of the trigger 122 to reset this trigger, thereby providing an Unlock output potential on the lead 130. This partially conditions the "and" circuits 114*a*, 114*c*, 114*e* and 114*g* and deconditions the "and" circuits 114*b*, 114*d*, 114*f* and 114*h*. The address coding is employed in the same way in either locking or unlocking of memory.

It will be understood that the invention may be applied to systems of information handling which have other numbers of core planes or other numbers of registers in the memory than are assumed in the embodiment illustrated herein. The invention may also be employed in systems other than those having memory structures of the three-dimensional stacked type, provided there is available a suitable means of substantially simultaneously changing the content of groups of status bit registers. It will be evident that the division of the memory structure into sections or into groups of registers may be made in any desired manner and need not comprise groups of consecutively numbered registers or registers having consecutive address numbers.

While, as described above, a "locked" register may be indicated by a "zero" status bit, the opposite arrangement may be used, in which a "locked" register is indicated by a "one" status bit, and an "unlocked" register is indicated by a "zero" status bit.

While an illustrative form of apparatus and a method in accordance with the invention have been described and shown herein, it will be understood that numerous changes may be made without departing from the general principles and scope of the invention.

What is claimed is:

1. In combination, a plurality of registers each capable of storing a plurality of bits associated with information to be stored, each said register being provided with means individual to said register for storing a status bit for controlling writing of new information into said register, sensing means operatively associated with each of said registers for sensing each bit associated with a given selected register including said status bit, first means connected to said sensing means and controlled by the sensed information in said status bit for preventing the writing of new information into the register, second means connected to said sensing means and controlled by the sensed information in said status bit for replacing in said register the information originally contained therein, and means for substantially simultaneously storing status bits in a predetermined group of said registers.

2. In an information-handling system, in combination, a plurality of registers each capable of storing a plurality of bits associated with information to be stored, each said register being provided with means individual to said register for storing a status bit for indicating a locked status of the associated register, sensing means for sensing each bit associated with any given selected register including said status bit, first means controlled by the sensed information in said status bit for preventing the writing of new information into the given selected register, second means controlled by the sensed information in said status bit for replacing in said register the original information content thereof, and means for substantially simultaneously setting the status bits of a predetermined group of registers to indicate a locked status.

3. Apparatus according to claim 2, in which the status bit represents a binary digit.

4. Apparatus according to claim 3, in which a binary digit "zero" indicates a locked status.

5. In an information-handling system, in combination, a plurality of registers each capable of storing a plurality of bits associated with information to be stored, each said register being provided with means individual to said register for storing a status bit for indicating whether or not writing of new information into the associated register is permissible, sensing means for sensing each bit associated with any given selected register including said status bit, first means controlled by the sensed indication of said status bit for selectively preventing the writing in of new information into said register, second means controlled by the sensed indication of said status bit for rewriting into said register the information initially contained therein, and means for substantially simultaneously storing status bits in a selected group of registers.

6. In an information-handling system, in combination, a plurality of registers for storing information, each said register comprising means for storing a plurality of bits representing the information to be stored together with a status bit indicating a "Don't Write" status or a "May Write" status associated with the associated register, sensing means for sensing each bit associated with a given selected register including said status bit, first means controlled by the sensed character of said status bit for preventing the writing in of new information into a register having a "Don't Write" status, second means controlled by the sensed character of said status bit for rewriting into said register the information originally stored therein, and means for setting substantially simultaneously the status bits of a group of registers.

7. In an information-handling system, in combination, an information register, means for storing a binary status bit indicative of the status of said information register, destructive read-out means for reading the information contents of said information register and of said binary status bit storing means, and means to regenerate said status bit after each reading.

8. In an information-handling system, in combination, a memory storage register, a status bit register associated with said memory storage register, individual means for sensing the information content of said memory storage register and of said status bit register, temporary storage means for holding the sensed information content of the said memory storage register and the character of the status bit, means to write in new information into said memory storage register, means to rewrite into said memory storage register the original information content thereof which is held in said temporary storage means, first means actuated by said temporary storage means in response to a status bit of one character to actuate said means to rewrite said original information content, and second means actuated by said temporary storage means in response to a status bit of another character to actuate said means to write in new information.

9. Apparatus according to claim 8, together with means to rewrite the said status bit into said status bit register without change of character, said last-mentioned means being operative substantially simultaneously with said first or said second writing means.

10. Apparatus according to claim 8, together with alarm means operative substantially simultaneously with said first writing means.

11. In an information-handling system, in combination, a plurality of registers each comprising a set of magnetic cores with associated actuating means, each core being capable of storing by residual magnetism a bit of information, each said register including a status core assigned for storing a status bit for indicating a locked status wherein writing of new information into the associated register is prevented or an unlocked status wherein such writing is permissible, sensing means individual to a group of said cores for sensing each bit associated with any given selected register including the status bit stored in its status core, first means controlled by said sensing means in accordance with the sensed indication of said status bit for selectively preventing the writing of new information into a selected register that is in the locked status, second means controlled by said sensing means in accordance with the sensed indication of said status bit for rewriting in the said register the information initially contained therein, and means for substantially simultaneously storing status bits in the status cores of a selected group of registers, whereby a selected group of registers may be locked so as to protect the cores therein.

References Cited in the file of this patent

UNITED STATES PATENTS 2,817,072 Chien ---------------- Dec. 17, 1957

2,954,166 Eckdahl -------------- Sept. 27, 1960